United States Patent [19]
Hofer et al.

[11] 3,846,513
[45] Nov. 5, 1974

[54] 2-CHLOROETHANE-(THIONO)-PHOSPHONIC ACID ESTERS

[75] Inventors: Wolfgang Hofer, Wuppertal-Vohwinkel; Reinhard Schliebs, Cologne; Robert Rudolf Schmidt, Leverkusen; Ludwig Eue, Cologne, all of Germany

[73] Assignee: Bayer Aktiengesellschaft, Leverkusen, Germany

[22] Filed: Sept. 29, 1970

[21] Appl. No.: 76,594

[30] Foreign Application Priority Data
Oct. 4, 1969   Germany............................ 1950099

[52] U.S. Cl............................ 260/960, 71/86, 71/87, 260/543 P, 260/953, 260/954
[51] Int. Cl. ............................................... C07f 9/34
[58] Field of Search ............ 260/960, 953, 954, 961

[56]   References Cited
UNITED STATES PATENTS

| | | | |
|---|---|---|---|
| 2,863,903 | 12/1958 | Toy et al............................ | 260/961 |
| 2,922,810 | 1/1960 | Toy et al......................... | 260/961 X |
| 3,644,600 | 2/1972 | Beriger ................................ | 260/959 |

OTHER PUBLICATIONS
Grapov et al., Chemical Abstracts, Vol. 70, (1969), 37882k.

*Primary Examiner*—Lorraine A. Weinberger
*Assistant Examiner*—Richard L. Raymond
*Attorney, Agent, or Firm*—Burgess, Dinklage and Sprung

[57]          ABSTRACT

Novel 2-chloroethanephosphonic acid and 2-chloroethanethionophosphonic acid derivatives of the formula

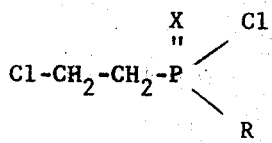

wherein X is oxygen or sulfur; and R is aryloxy, optionally substituted with hydroxy, alkyl, halogen, or nitro, or monoarylamino, or monoalkylamino of from 1 to 6 atoms; exhibit marked plant growth influencing properties, e.g., inhibition or stimulation or alteration of plant growth.

5 Claims, No Drawings

2-CHLOROETHANE-(THIONO)-PHOSPHONIC ACID ESTERS

The present invention relates to certain new 2-chloroethane-(thiono)-phosphonic acid derivatives, to compositions containing them, and to their use, as agents for regulating plant growth.

It is known from Dutch Pat. Specification 6,802,633 that 2-chloroethanephosponic acid exhibits -chloroethanephosphonic properties.

The present invention provides 2-chloroethanephosphonic acid derivatives or 2-chloroethanethionophosphonic acid derivatives of the general formula

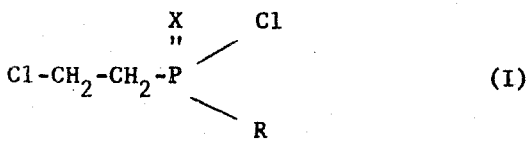

in which
X is oxygen or sulfur; and
R is aryloxy, optionally substituted with hydroxy, alkyl, preferably lower alkyl, halogen or nitro, or R is monoaryl-amino or monoalkylamino of from 1 to 6 carbon atoms. R is preferably phenyloxy which is unsubstituted or substituted by nitro, methyl, hydroxyl and/or chloro and R is preferably monophenylamino or monoalkylamino of from 1 to 4 carbon atoms.

The compounds of this invention exhibit strong plant-growth-regulating properties. Surprisingly, the 2-chloroethane-(thiono)-phosphonic acid derivatives according to the invention show a noteworthily greater plant-growth-regulating activity than the 2-chloroethanephosphonic acid known from the prior art which is the chemically closest active compound of the same type of activity. The substances according to the invention therefore represent a valuable enrichment of the art.

The invention also provides a process for the production of a 2-chloroethane-(thiono)-phosphonic acid derivative of the formula (I) in which a 2-chloroethane-(thiono)-phosphonic acid dichloride of the general formula

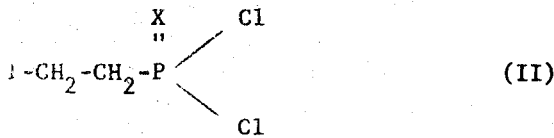

in which
X has the meaning stated above,
is reacted with a phenol or primary amine of the general formula

H—R     (III)

in which
R has the meaning stated above
(in the case of a phenol, this may be used in the form of its alkali metal, alkaline earth metal or ammonium salt), optionally in the presence of an acid-binding agent and optionally in the presence of a solvent.

If 2-chloroethanephosphonic acid dichloride and methylamine are used as starting materials, the reaction course can be represented by the following formula scheme

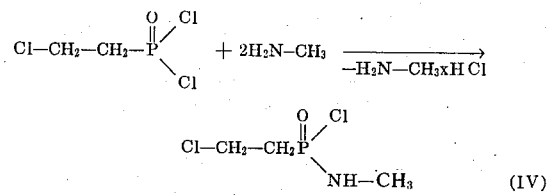

The starting materials are defined generally by the formulae (II) and (III).

As examples of the amines or phenols which can be used as starting materials to make the compounds according to the invention, there may be mentioned in particular: phenylamine, methylamine, ethylamine, n-propylamine, iso-propylamine, and n-, sec.-, tert.- and iso-butylamine; 2-, 3- and 4-chlorophenol, 2-, 3- and 4-nitrophenol, 2-, 3- and 4-methylphenol and resorcinol, catechol and hydroquinone.

The 2-chloroethane-(thiono)-phosphonic acid dichlorides, the primary amines and the phenols which may be used as starting materials are generally known and can be prepared according to known methods.

The solvent (this term includes a mere diluent) which may be used in the process according to the invention may for example be water or an inert organic solvent. Preferred examples include aliphatic and aromatic hydrocarbons (which may be chlorinated), such as benzene, toluene, xylene, benzine, methylene chloride, chloroform, carbon tetrachloride and chlorobenzene; ethers, such as diethyl ether, dibutyl ether and dioxan; ketones, such as acetone, methylethyl ketone, methylisopropyl ketone and methylisobutyl ketone; and nitriles, such as acetonitrile.

As acid acceptors, all customary acid-binding agents are suitable. Particularly suitable have proved to be the alkali metal carbonates and alcoholates, such as sodium or potassium carbonate, or sodium or potassium methylate or ethylate; and aliphatic, aromatic or heterocyclic amines, for example triethylamine, dimethylamine, dimethylaniline, dimethylbenzylamine and pyridine. Preferably an excess (for example of about one mole equivalent) of the amine of the general formula (III) to be used is employed as acid-binder.

The reaction temperature can be varied within a fairly wide range. In general, the reaction is carried out at −10° to 50°, preferably at 0° to 20°C.

The reactions are, in general, carried out at normal pressure.

When carrying out the process according to the invention, 2 moles of primary amine or 1 mole of phenol and about 1 mole of acid-binder or 1 mole of alkali metal phenolate, alkaline earth metal phenolate or ammonium phenolate may generally be used per mole of 2-chloroethane-(thiono)-phosphonic acid dichloride. As indicated above, the reaction may be carried out in water or another suitable solvent, in most cases at room temperature.

Working up may take place according to customary methods. The substances according to the invention are obtained in most cases in the form of colorless to slightly yellow-colored, viscous, water-insoluble oils, which cannot be distilled without decomposition but can, by so-called "slight distillation" (that is, longer heating to moderately elevated temperatures under reduced pressure), be freed from the last volatile components and in this way be purified. They may be characterised especially by their refractive index as well as their elementary analysis.

The chloroethane-(thiono)-phosphonic acid derivatives interfere with the physiological phenomena of plant growth and can therefore be used as plant growth regulators.

The different effects of these active compounds depend essentially on the point in time of the application, with reference to the development stage of the seed or the plant, as well as on the concentration applied.

Plant growth regulators are used for various purposes which are connected with the development stage of the plants. Thus, with plant growth regulators, the seed germination can, depending on the concentration applied, either be inhibited or promoted. This inhibition or promotion relates to the seedling development.

The bud dormancy of the plants, that is to say the endogenic annular cycle, can be influenced by the active compounds, so that the plants for example shoot or blossom at a point in time at which they normally show no readiness to shoot or blossom.

The shoot or root growth can be promoted or inhibited by the active compounds in manner dependent on concentration. Thus, it is possible to inhibit very strongly the growth of the fully formed plant, or to bring the plant as a whole to a more robust habitus or to produce a dwarf growth.

Possible economic applications include the suppression of grass growth at roadsides and waysides, and the inhibition of the growth of lawns so that the frequency of grass-cutting (of lawn-mowing) can be reduced.

During the growth of the plant, the branching to the side can be multiplied by a chemical breaking of the apical dominance. This is particularly useful in the case of propagation of plants by cuttings. In concentration-dependent manner, however, it is also possible to inhibit the growth of side-shoots, for example in order to prevent the formation of side-shoots in tobacco plants after decapitation and thus to promote the leaf growth.

In the case of the influencing of blossom formation, there can be achieved, in manner dependent on concentration and the point in time of the application, either a retarding or an acceleration of blossom formation. In certain circumstances, a multiplication of blossom initiation can also be attained, these effects occurring when the appropriate treatments are carried out at the time of the normal blossom formation.

The influence of the active compound on the foliage of the plants can be so regulated that a defoliation is achieved, for example in order to facilitate the harvest or to reduce transpiration at a time at which the plants are to be transplanted.

Fruit initiation can be promoted to that more fruits or seedless fruits are formed (parthenocarpy). In certain conditions, the premature fall of fruit can also be prevented, or the fruit fall can be promoted up to a certain extent in the sense of a chemical thinning out. The promotion of the fruit fall can also be exploited by effecting the treatment at the time of the harvest, whereby harvesting may be facilitated.

By spraying the unripe fruits with the compounds according to the invention, the ripening process can also be accelerated and a better coloring of the fruits can be achieved.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agent, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulphoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include nonionic and anionic emulsifiers, such as polyoxyethylene-fatty acid esters, polyoxyethylene-fatty alcohol ethers, for example alkylarylpolyglycol ethers, alkyl sulphonates and aryl sulphonates; and preferred examples of dispersing agents include lignin, sulphite waste liquors and methyl cellulose.

The formulations contain, in general, from 0.1 to 95, preferably 0.5 to 90, percent by weight of active compound.

The active compounds may be applied as such or in the form of their formulations or of the application forms prepared therefrom, such as ready-to-use solutions, emulsifiable concentrates, emulsions, suspensions, spray powders, pastes, soluble powders, dusting agents and granulates. Application may take place in the usual manner, for example by watering, squirting, spraying, scattering, dusting, etc.

The concentrations of active compound can be varied within a fairly wide range for actual application. In general, concentrations of 0.0005 to 2 percent by weight, preferably 0.01 to 0.5 percent, are used.

Further, there are applied, in general, 0.1 to 100 kg, preferably 1 to 10 kg, of active compound per hectare.

For the application time, it is generally true to say that the application of the growth regulators is effected in a preferred space of time, the precise delimitation of which is governed by the climatic and vegetative circumstances.

The compounds according to the invention also have an activity against plant-damaging bacteria.

The invention therefore provides a composition for the control of plant growth containing as active ingredient a compound according to the invention in admixture with a solid diluent or carrier or in admixture with a liquid diluent or carrier containing a surface-active agent.

The invention also provides a method for influencing plant growth which comprises applying to the plant or seed thereof a compound according to the invention alone or in the form of a composition containing as active ingredient a compound according to the invention in admixture with a solid or liquid diluent or carrier.

The invention is illustrated by the following Examples.

The following compounds, representative of the invention, were used as test compounds and/or to illustrate preparation procedures, in the Examples, below.

| Compound | |
|---|---|
| 1 (control unknown) | 2-Chloroethanephosphonic acid |
| 2 | 2-Chloroethanephosphonic acid mono-N-isopropylamide chloride |
| 3 | 2-Chloroethanethionophosphonic acid mono-N-isopropylamide chloride |
| 4 | 2-Chloroethanethionophosphonic acid 3-chlorophenyl ester chloride |
| 5 | 2-Chloroethanethionophosphonic acid mono-N-methylamide chloride |
| 6 | 2-Chloroethanethionophosphonic acid phenyl ester chloride |
| 7 | 2-Chloroethanephosphonic acid phenyl ester chloride |
| 8 | 2-Chloroethanephosphonic acid mono-N-n-butylamide chloride |
| 9 | 2-Chloroethanethionophosphonic acid 4'-methylphenyl ester chloride |
| 10 | 2-Chloroethanethionophosphonic acid 2-chlorophenyl ester chloride |
| 11 | 2-Chloroethanethionophosphonic acid 2',6'-dichlorophenyl ester chloride |
| 12 | 2-Chloroethanephosphonic acid mono-N-methylamide chloride |
| 13 | 2-Chloroethanethionophosphonic acid mono-N-n-butylamide chloride |
| 14 | 2-Chloroethanethionophosphonic acid anilide chloride |
| 15 | 2-Chloroethanethionophosphonic acid 4'-chlorophenyl ester chloride |
| 16 | 2-Chloroethane-thionophosphonic acid 2',4'-dichlorophenyl ester chloride |
| 17 | 2-Chloroethanethionophosphonic acid 4'-hydroxyphenyl ester chloride |
| Compound — Continued | |
| 18 | 2-Chloroethanethionophosphonic acid 3'-nitrophenyl ester chloride. |

EXAMPLE A

Growth Inhibition/Linseed Test

Solvent: 40 parts by weight acetone
Emulsifier: 0.25 part by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Two batches of 25 linseeds were each laid out on a filter paper in a Petri dish. 10 ml of the preparation of active compound was pipetted into each dish. Germination of the seeds took place in the dark at 25°C.

After three days, the length of the shoot and the roots was determined and the growth inhibition compared with the control plant was expressed as a percentage. 100 percent denoted the standstill of growth, and 0 percent denoted a growth corresponding to that of the untreated plant.

The active compounds, the concentrations of the active compounds ink ppm (= mg/kg) and results are set forth in Tables A1 and A2.

TABLE A1

Growth inhibition/linseed

| Active compound | % inhibition with 250 ppm | |
|---|---|---|
| | root | shoot |
| water (control) | 0 | 0 |
| 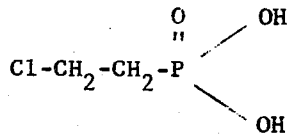 (known - Compound 1) | 83 | 36 |
| 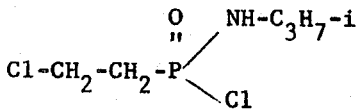 (Compound 2) | 85 | 55 |

TABLE A2

Growth inhibition/linseed

| Active compound | % inhibition of the shoot with | |
|---|---|---|
| | 50 ppm | 250 ppm |
| Water (control) | 0 | 0 |
| Cl-CH$_2$-CH$_2$-P(=O)(OH)(OH) (known-Compound 1) | 15 | 36 |
| Cl-CH$_2$-CH$_2$-P(=S)(NH-C$_3$H$_7$-i)(Cl) (Compound 3) | 40 | 54 |
| Cl-CH$_2$-CH$_2$-P(=S)(O-C$_6$H$_4$-Cl)(Cl) (Compound 4) | 25 | 50 |

EXAMPLE B

Growth Inhibition and Defoliation/Beans

Solvent: 40 parts by weight acetone
Emulsifier: 0.25 parts by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Beans (*Phaseolus vulgaris*) 10 cm high were sprayed with preparations which contained 5,000 ppm of active compound. After 6 days, the average length and the number of leaves of 3 beans per experiment were evaluated.

The results can be seen from Table B.

TABLE B

Growth inhibition and defoliation/beans

| Active compound | Length in cm | Number of leaves |
|---|---|---|
| water (control) | 17.0 | 6 |
| 2-chloroethanephosphonic acid (known) | 11.0 | 4 |
| Cl-CH$_2$-CH$_2$-P(=S)(NH-CH$_3$)(Cl) (Compound 5) | 11.0 | 3 |

TABLE B—Continued

Growth inhibition and defoliation/beans

| Active compound | Length in cm | Number of leaves |
|---|---|---|
| Cl-CH$_2$-CH$_2$-P(=O)(NH-C$_3$H$_7$-i)(Cl) (Compound 2) | 11.0 | 3 |
| Cl-CH$_2$-CH$_2$-P(=S)(O-C$_6$H$_5$)(Cl) (Compound 6) | 11.5 | 0 |

EXAMPLE C

Growth Inhibition/Wheat

Solvent: 40 parts by weight acetone
Emulsifier: 0.25 parts by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Wheat plants of a size of 4 cm were sprayed with a preparation which contained 5,000 ppm of active compound. After 10 days, the average length of the wheat was evaluated.

The results can be seen from Table C.

TABLE C

Growth inhibition/wheat

| Active compound | Length in cm |
|---|---|
| water (control) | 20.0 |
| 2-chloroethane-phosphonic acid (known - Compound 1) | 6.5 |
| Cl-CH$_2$-CH$_2$-P(=S)(NH-CH$_3$)(Cl) (Compound 5) | 6.0 |
| Cl-CH$_2$-CH$_2$-P(=S)(O-C$_6$H$_5$)(Cl) (Compound 6) | 5.0 |

EXAMPLE D

Growth Inhibition/Beans (Watering Test)

Solvent: 40 parts by weight acetone
Emulsifier: 0.25 parts by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Three bean plants (of a height of 10 cm) in a pot (9 cm diameter) were watered once with a preparation of active compound corresponding to an applied amount of 10 kg/hectare. After 8 days, the length of the beans was determined.

The results can be seen from Table D.

EXAMPLE E

Growth Inhibition/Millet

Solvent: 40 parts by weight acetone
Emulsifier: 0.25 parts by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (ph 6) to the desired concentration.

Millet plants (*Panicum miliaceum*) of a size of 4 cm were sprayed with a preparation which contained 2,000 and 1,000 ppm of active compound. After 6 days, the growth increase was evaluated.

The results can be seen from Table E.

TABLE D

Growth inhibition/beans (watering test)

| Active compound | Length in cm |
|---|---|
| water (control) | 25.0 |
| 2-chloroethane-phosphonic acid (known-Compound 1) | 14.0 |
| $Cl\text{-}CH_2\text{-}CH_2\text{-}P(\!=\!S)(NH\text{-}CH_3)(Cl)$ (Compound 5) | 14.0 |
| $Cl\text{-}CH_2\text{-}CH_2\text{-}P(\!=\!O)(NH\text{-}C_3H_7\text{-}i)(Cl)$ (Compound 2) | 11.5 |

TABLE E

Growth inhibition/millet

| Active compound | Concentration in ppm | Growth increase in cm |
|---|---|---|
| water (control) | 0 | 9.0 |
| 2-chloroethane-phosphonic acid (known - Compound 1) | 2000 | 2.0 |
|  | 1000 | 5.0 |
| $Cl\text{-}CH_2\text{-}CH_2\text{-}P(\!=\!S)(NH\text{-}CH_3)(Cl)$ (Compound 5) | 2000 | 1.0 |
|  | 1000 | 4.0 |

EXAMPLE F

Acceleration of Fruit Ripeness/Tomato Plants

Solvent: 40 parts by weight acetone
Emulsifier: 0.25 parts by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Green, unripe fruits of tomato plants were sprayed once with a preparation which contained 5,000 ppm of active compound. An accelerated ripening of the fruits was thereby achieved.

The active compounds and results can be seen from Table F.

TABLE F

Acceleration of fruit ripeness/tomato plants

| Active compound | Acceleration of ripeness in days |
|---|---|
| water (control) | 0 |
| 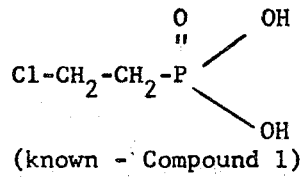 (known - Compound 1) | 12 |
| 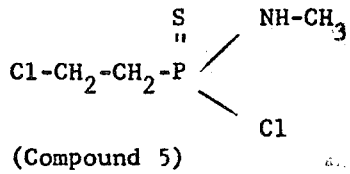 (Compound 5) | 15 |
| 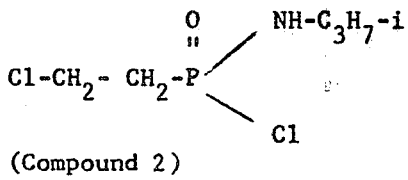 (Compound 2) | 17 |
| Le A 12482 | 18. |
| 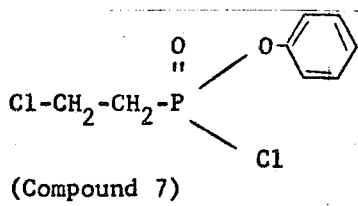 (Compound 7) | 14 |
| 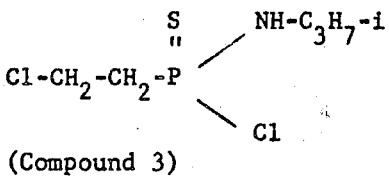 (Compound 3) | 15 |

EXAMPLE G

Growth Inhibition/Beans

Solvent: 40 parts by weight acetone
Emulsifier: 0.25 parts by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Beans (Phaseolus) 10 cm high were sprayed with preparations which contained 2,500 ppm of active compound. After 6 days, the average length was determined and the inhibition of growth increased in comparison with the untreated control was expressed in percent.

The active compounds and results can be seen from Table G.

TABLE G

Growth inhibition/beans

| Active compound | % inhibition of the shoot with 2500 ppm |
|---|---|
| water (control) | 0 |
| $Cl-CH_2-CH_2-P(=O)(OH)(OH)$ (known - Compound 1) | 52 |
| $Cl-CH_2-CH_2-P(=O)(NH-C_4H_9-n)(Cl)$ (Compound 8) | 63 |
| $Cl-CH_2-CH_2-P(=S)(O-C_6H_4-CH_3)(Cl)$ (Compound 9) | 55 |
| $Cl-CH_2-CH_2-P(=S)(O-C_6H_4-Cl)(Cl)$ (Compound 10) | 63 |
| $Cl-CH_2-CH_2-P(=S)(O-C_6H_3Cl_2)(Cl)$ (Compound 11) | 68 |

EXAMPLE 1 — PREPARATION OF COMPOUND 5

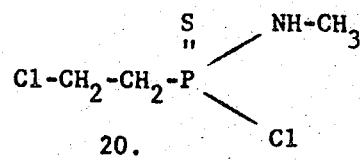

15.5 g (0.5 mole) methylamine in 200 ml toluene were added to 49.5 g (0.25 mole) 2-chloroethanethionophosphonic acid dichloride in 500 ml toluene. Stirring was effected for one hour at room temperature, then the salts were filtered off with suction; washing with water was effected, followed by drying over sodium sulphate, and the solvent was drawn off. After "slight distillation" at 0.01 mm Hg/80°C, a yellow oil remained behind.

Yield: 41 g (85 percent) of 2-chloroethanethionophosphonic acid mono-N-methylamide chloride, $n_D^{28} = 1.5613$.

Analysis:

| Calculated for $C_3H_8Cl_2NPS$: | S | 16.65 | N | 7.3% |
|---|---|---|---|---|
| Found: | | 16.47 | | 7.35 |

EXAMPLE 2 — PREPARATION OF COMPOUND 6

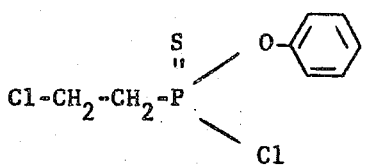

19 g (0.2 mole) phenol in 50 ml $H_2O$ and 8 g (0.2 mole) sodium hydroxide were added at 20° to 39.5 g (0.2 mole) 2-chloroethanethionophosphonic acid dichloride. Stirring was effected for 2 hours at room temperature; taking up in methylene chloride was then effected, followed by separation of the organic phase and washing with water. After drying over sodium sulphate, the solvent was drawn off, and "slight distillation" was subsequently effected (1 mm Hg/60°C).

Yield: 39 g (77 percent) of 2-chloroethanethionophsophonic acid phenyl ester chloride as colorless liquid, $n_D^{28} = 1.5688$.

Analysis:

| Calculated for $C_8H_9Cl_2OPS$: | S | 12.55% | Cl | 27.9% |
|---|---|---|---|---|
| Found: | | 12.46 | | 28.82 |

EXAMPLE 3 — PREPARATION OF COMPOUND 2

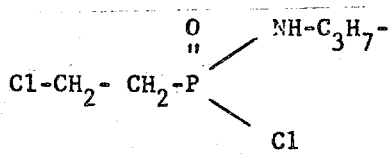

59 g (1 mole) i-propylamine were added at 0° to 91 g (0.5 mole) 2-chloroethanephosphonic acid dichloride in 1,500 ml toluene. Stirring was effected for 1 hour at room temperature, and the salts were filtered off with suction; the solution was washed with a little water, and the solvent was distilled off.

Yield: 93 g (91 percent) of 2-chloroethanephosphonic acid mono-N-isopropylamide chloride; $n_D^{28} = 1.4854$.

Analysis:

| Calculated for $C_5H_{12}Cl_2NOP$: | N | 6.85 | Cl | 34.8% |
|---|---|---|---|---|
| Found: | | 6.58 | | 33.74 |

EXAMPLE 4 — PREPARATION OF COMPOUND 12

Analogously with Example 3, there was prepared the compound of the formula

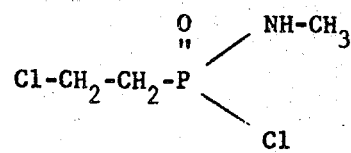

Yield: 56 percent 2-chloroethane-phosphonic acid mono-N-methylamide chloride, $n_D^{28} = 1.5019$

EXAMPLE 5 — PREPARATION OF COMPOUND 3

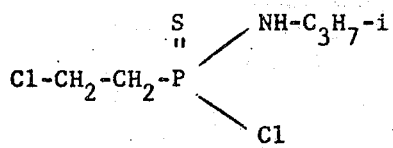

59 g (1 mole) i-propylamine was added, with cooling, to 99 g (0.5 mole) 2-chloroethanethionophosphonic acid dichloride in 1,500 ml toluene. Stirring was effected for one hour at room temperature, then the salts were filtered off with suction; washing with water was effected, followed by drying over sodium sulphate, and the solvent was drawn off. After "slight distillation," a pale oil remained behind. Yield: 95 g = 87 l percent of the theory 2-chloroethanethionophosphonic acid mono-N-isopropylamide chloride, $n_D^{26} : 1.5476$.

Analysis:

| Calculated for $C_5H_{12}Cl_2NPS$: | 32.15% Cl | 6.35% N | 14.55% S |
|---|---|---|---|
| Found: | 31.74% Cl | 5.85% N | 14.94% S |

EXAMPLE 6 — PREPARATION OF COMPOUND 13

Analogously with Example 5, there was prepared the compound of the formula

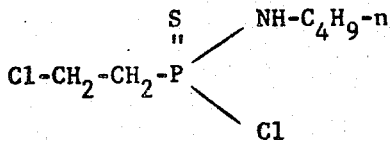

Yield: 91 percent 2-chloroethane-thiono-phosphonic acid mono-N-n-butylamide chloride, $n_D^{23} : 1.5363$.

EXAMPLE 7 — PREPARATION OF COMPOUND 14

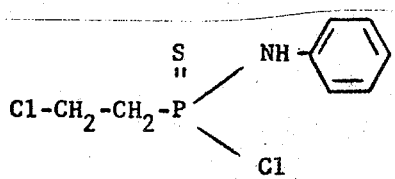

93 g (1 mole) aniline were added at 0°C, with cooling, to 99 g (0.5 mole) 2-chloroethanethionophosphonic acid dichloride in 1,000 ml acetonitrile. Stirring was effected for 2 hours at room temperature, then the solvent was drawn off; taking up in benzene was effected, followed by separation of the salts and washing with 1N hydrochloric acid. After drying with sodium sulphate, the solvent was drawn off and the residue was "slightly distilled." Yield: 101 g (79 percent of the theory) of 2-chloroethanethionophosphonic acid anilide chloride, $n_D^{23}$ : 1.6145.

Analysis:

| | | | |
|---|---|---|---|
| Calculated for $C_8H_{10}Cl_2NPS$: | 28.00% Cl | 5.50% N | 12.60% S |
| Found: | 28.00% Cl | 5.32% N | 12.62% S |

EXAMPLE 8 — PREPARATION OF COMPOUND 8

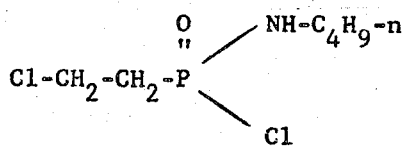

73 g (1 mole) n-butylamine were added, with cooling, to 91 g (0.5 mole) 2-chloroethanephosphonic acid dichloride in 1,500 ml toluene. Stirring was effected for 2 hours at room temperature, then the salts were filtered off with suction; washing with water was effected, followed by drying with sodium sulphate, and the solvent was drawn off. After "slight distillation," a pale oil remained behind.

Yield: 75 g (69 percent of the theory) of 2-chloroethanephosphonic acid mono-N-n-butylamide chloride, $n_D^{23}$ : 1.4962.

Analysis:

| | | |
|---|---|---|
| Calculated for $C_6H_{14}Cl_2NOP$: | 32.60% Cl | 6.42% N |
| Found: | 32.38% Cl | 6.52% N |

EXAMPLE 9 — PREPARATION OF COMPOUND 15

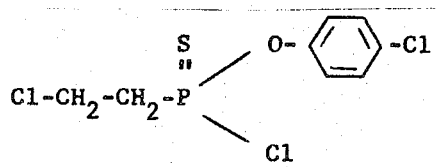

A solution of 65 g (0.5 mole) 4-chlorophenol and 20 g (0.5 mole) sodium hydroxide in 200 ml of water was added at 20°C, with vigorous stirring, to 99 g (0.5 mole) 2-chloro-ethanethionophosphonic acid dichloride. Stirring was effected for 1 hour at room temperature; taking up in methylene chloride was then effected, the aqueous phase was separated off and the organic phase was washed with a normal aqueous sodium hydroxide solution and subsequently with water. After drying with sodium sulphate, the solvent was drawn off and the residue was "slightly distilled." There remained behind a pale oil, $n_D^{23}$ : 1.5856, yield: 86 g (59 percent of the theory) 2-chloroethanethionophosphonic acid 4'-chlorophenyl ester chloride.

Analysis:

| | | |
|---|---|---|
| Calculated for $C_8H_8Cl_3OPS$: | 36.80% Cl | 11.05% S |
| Found: | 35.83% Cl | 10.64% S |

EXAMPLE 10 — PREPARATION OF COMPOUND 16

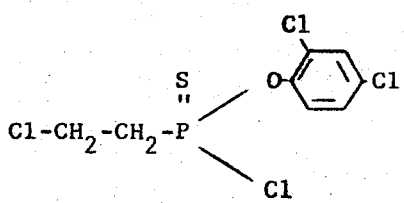

Yield: 60 percent 2-chloroethane-thiono-phosphonic acid 2',4'-dichlorophenyl ester chloride, $n_D^{20}$ : 1.5962.

EXAMPLE 11 — PREPARATION OF COMPOUND 9

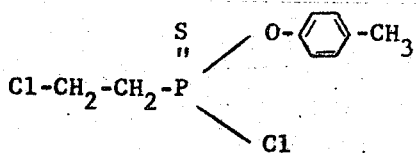

Yield: 64 percent 2-chloroethane-thiono-phosphonic acid 4'-methylphenyl ester chloride, $n_D^{24}$ : 1.5686.

EXAMPLE 12 — PREPARATION OF COMPOUND 17

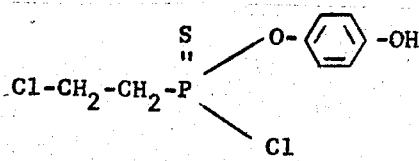

Yield: 58 percent 2-chloroethane-thiono-phosphonic acid 4'-hydroxyphenyl ester chloride, $n_D^{24}$ : 1.6031.

EXAMPLE 13 — PREPARATION OF COMPOUND 10

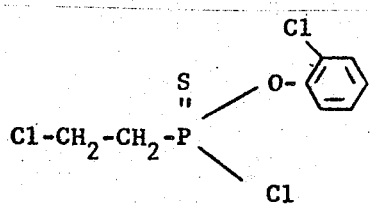

Yield: 66 percent 2-chloroethane-thiono-phosphonic acid 2'-chlorophenyl ester chloride, $n_D^{24}$ : 1.5862.

EXAMPLE 14 — PREPARATION OF COMPOUND 11

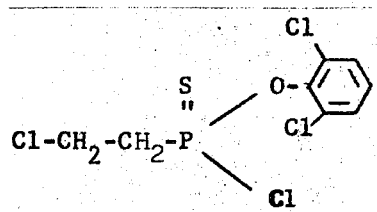

Yield: 53 percent 2-chloroethane-thiono-phosphonic acid 2',6'-dichlorophenyl ester chloride, $n_D^{24}$ : 1.5944.

EXAMPLE 15 — PREPARATION OF COMPOUND 4

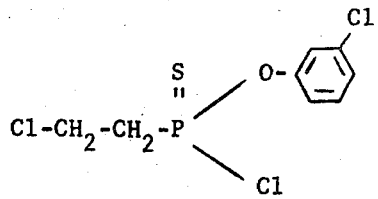

Yield: 73 percent 2-chloroethane-thiono-phosphonic acid 3'-chlorophenyl ester chloride, $n_D^{24}$ : 1.5851.

EXAMPLE 16 — PREPARATION OF COMPOUND 18

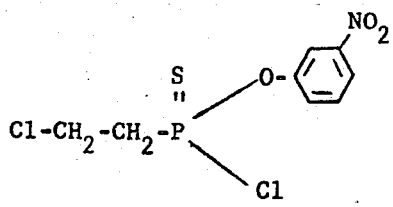

Yield: 34 percent 2-chloroethane-thiono-phosphonic acid 3'-nitrophenyl ester chloride, $n_D^{23}$ : 1.5985.

It will be appreciated that the instant specification and examples are set forth by way of illustration and not limitation, and that various modifications and changes may be made without departing from the spirit and scope of the present invention.

What is claimed is:

1. 2-Chloroethanephosphonic acid and 2-chloroethane-thionophosphonic acid compound of the general formula

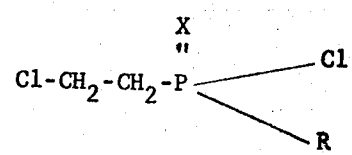

in which
X is oxygen or sulfur;
R is unsubstituted aryloxy or substituted aryloxy or substituted with alkyl, hydroxy or nitro.

2. Compound as claimed in claim 1 wherein R is phenyloxy or substituted phenyloxy substituted with methyl, hydroxy, or nitro.

3. Compound as claimed in claim 1 designated as 2-chloroethanethionophosphonic acid phenyl ester chloride.

4. Compound as claimed in claim 1 designated as 2-chloroethanephosphonic acid phenyl ester chloride.

5. Compound as claimed in claim 1 designated as 2-chloroethanethionophosphonic acid 4'-methylphenyl ester chloride.

* * * * *